United States Patent [19]

Shepard et al.

[11] Patent Number: 5,532,469
[45] Date of Patent: *Jul. 2, 1996

[54] HAND HELD BAR CODE READER WITH INPUT AND DISPLAY DEVICE AND PROCESSOR

[75] Inventors: Howard M. Shepard, Great River; Edward D. Barkan, South Setauket; Jerome Swartz, Stonybrook, all of N.Y.

[73] Assignee: Symbol Technologies, Inc., Bohemia, N.Y.

[*] Notice: The term of this patent shall not extend beyond the expiration date of Pat. No. 5,758,717.

[21] Appl. No.: 377,998

[22] Filed: Jan. 25, 1995

Related U.S. Application Data

[60] Continuation of Ser. No. 93,967, Jul. 21, 1993, Pat. No. 5,396,055, which is a division of Ser. No. 895,277, Jun. 8, 1992, Pat. No. 5,262,628, which is a division of Ser. No. 272,545, Nov. 17, 1988, Pat. No. 5,130,520, which is a division of Ser. No. 148,555, Jan. 26, 1988, Pat. No. 4,845,350, which is a division of Ser. No. 883,923, Jul. 10, 1986, Pat. No. 4,758,717, which is a division of Ser. No. 519,523, Aug. 1, 1983, Pat. No. 4,673,805, which is a division of Ser. No. 342,231, Jan. 25, 1982, Pat. No. 4,409,470.

[51] Int. Cl.⁶ .................................................. G06K 7/10
[52] U.S. Cl. .................................................. 235/472
[58] Field of Search ...................................... 235/462, 472

[56] References Cited

U.S. PATENT DOCUMENTS

| | | | |
|---|---|---|---|
| 3,826,900 | 7/1974 | Moellering | 235/61.11 E |
| 3,918,028 | 11/1975 | Humphrey et al. | 340/146.3 F |
| 3,978,317 | 9/1976 | Yamaguchi et al. | 235/61.11 E |
| 3,978,318 | 8/1976 | Romeo et al. | 235/61.11 E |
| 3,991,299 | 11/1976 | Chadima et al. | 235/61.11 E |
| 4,061,380 | 12/1977 | Carnahan et al. | 339/8 R |
| 4,088,981 | 5/1978 | Gott | 340/146.3 |
| 4,101,072 | 7/1978 | Weaver et al. | 235/455 |
| 4,115,703 | 9/1978 | Dobras | 250/568 |
| 4,118,687 | 10/1978 | McWaters et al. | 340/146.3 |
| 4,128,298 | 12/1978 | McMillan | 350/96.10 |
| 4,158,194 | 6/1979 | McWaters et al. | 340/146.3 |
| 4,247,908 | 1/1981 | Lockart et al. | 364/900 |
| 4,251,798 | 2/1981 | Swartz et al. | 340/146.3 |
| 4,355,301 | 10/1982 | Issihiki et al. | 340/146.3 D |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shephard et al. | 235/472 |
| 4,418,277 | 11/1983 | Tremmel et al. | 235/472 |
| 4,460,120 | 7/1984 | Shephard et al. | 235/472 |
| 4,523,235 | 6/1985 | Rajchman | 358/256 |
| 4,570,057 | 2/1986 | Chadima, Jr. et al. | 235/472 |
| 4,673,805 | 6/1987 | Shephard et al. | 235/472 |
| 4,736,095 | 4/1988 | Shephard et al. | 235/472 |
| 4,758,717 | 7/1988 | Shepard et al. | 235/462 |
| 4,766,300 | 8/1988 | Chadima, Jr. et al. | 235/472 |
| 5,262,628 | 11/1993 | Shepard et al. | 235/472 |
| 5,396,055 | 3/1995 | Shepard et al. | 235/472 |

FOREIGN PATENT DOCUMENTS 0069574   1/1983   European Pat. Off. .......... G06K 7/10

Primary Examiner—John Shepperd
Attorney, Agent, or Firm—Arnold, White & Durkee

[57] ABSTRACT

A scanning head for reading bar code signals including a laser source producing a beam which is scanned across a symbol to be read by a moving mirror arrangement, and a photodetector responsive to light reflected from the symbol. The signal from the photodetector is digitized and decoded to recover bar code data. The scanning head includes a manually actuated input and display device. A microprocessor in the head controls the operation of the various components. A transmitter and receiver may be located in the scanning head for communication with a central computer, and a battery may be included in the head as a power supply so that the scanning head need not be connected by a cable to a terminal.

29 Claims, 5 Drawing Sheets

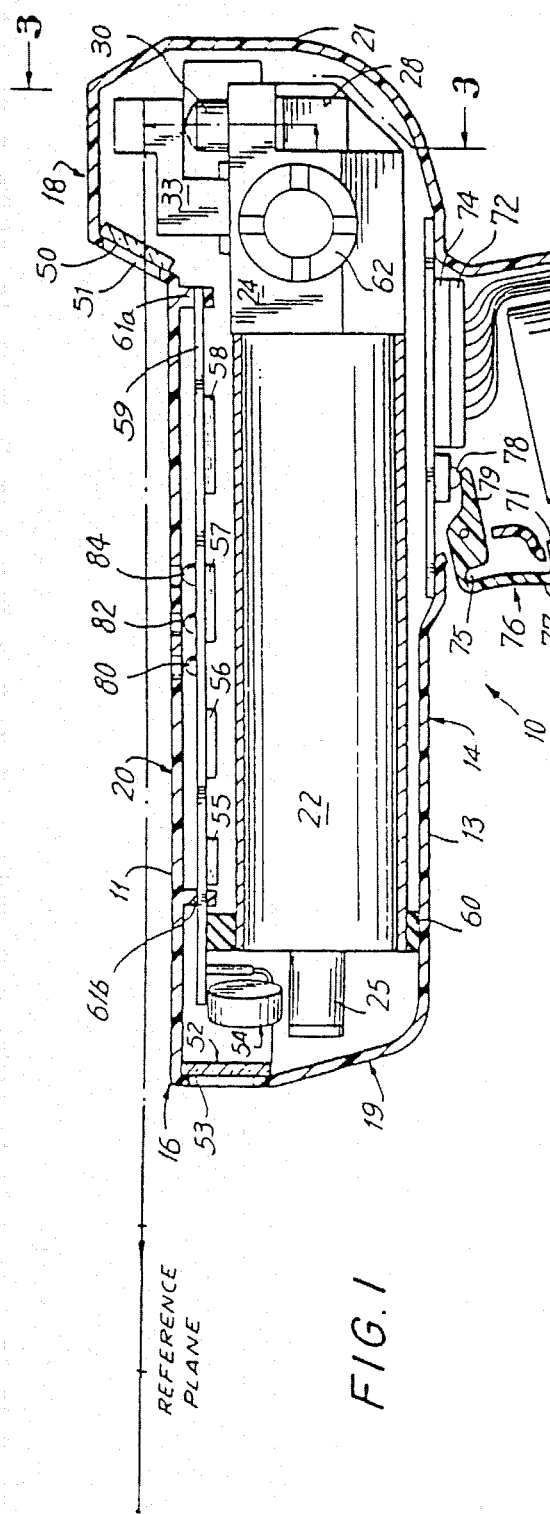
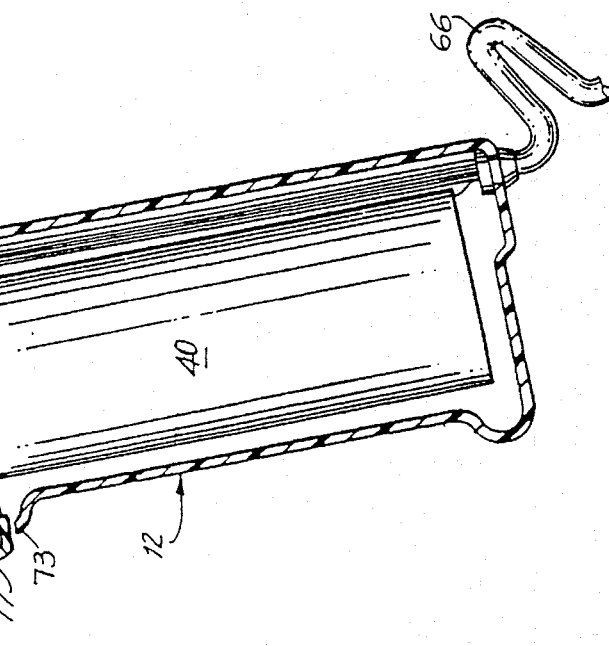
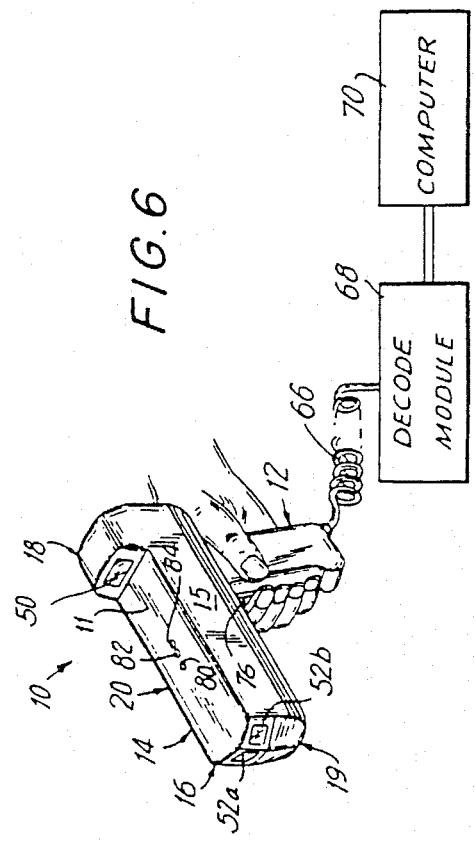

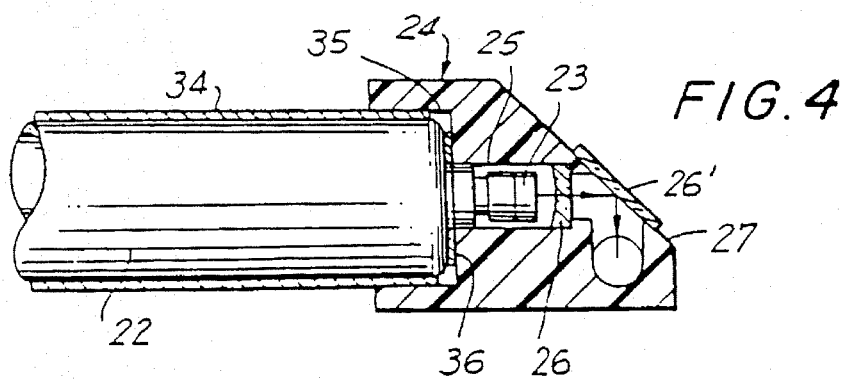
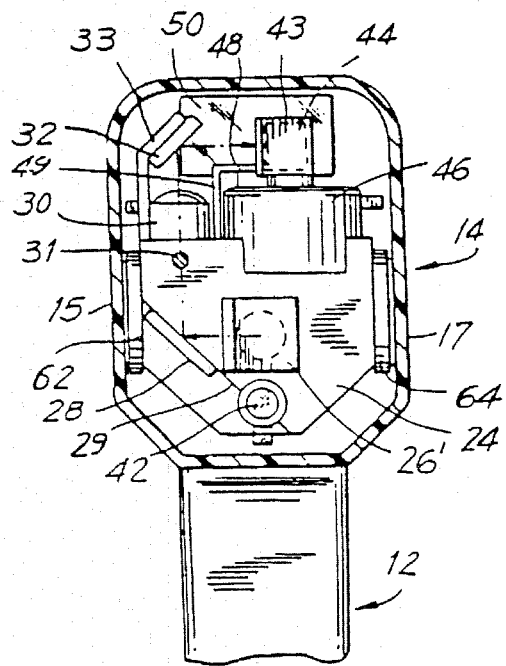
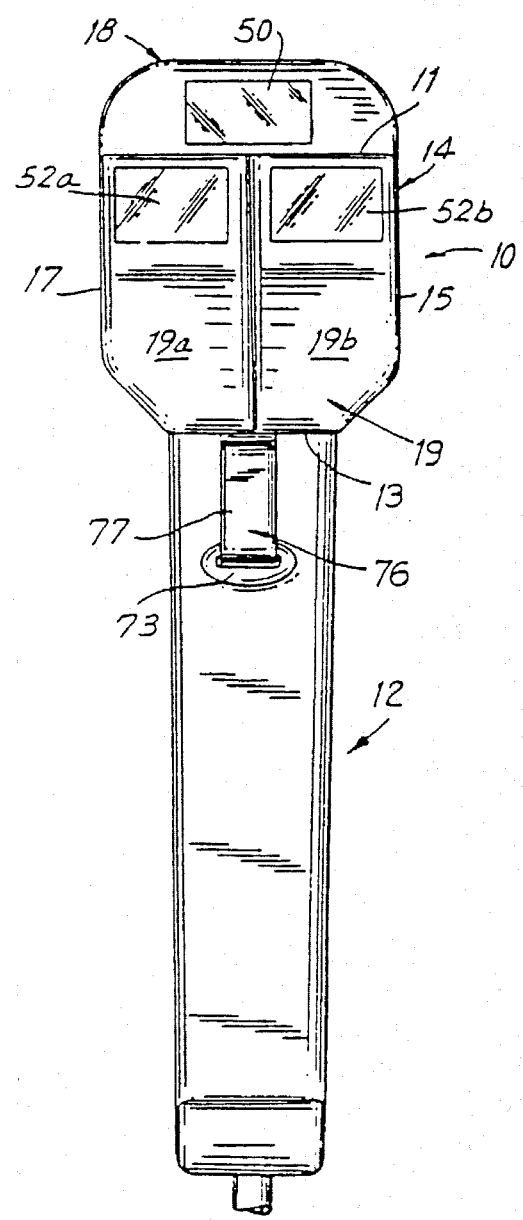

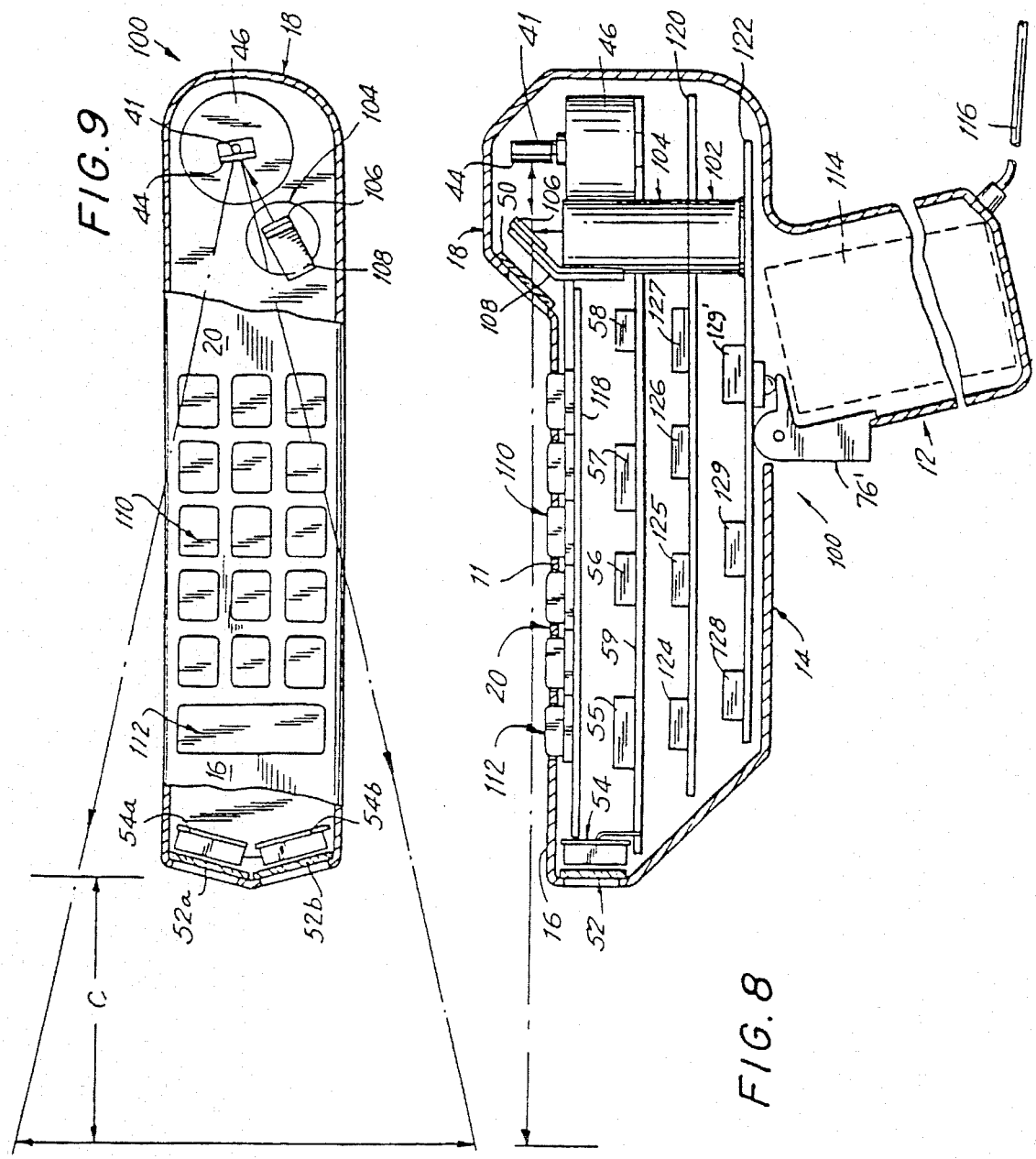

HAND HELD BAR CODE READER WITH INPUT AND DISPLAY DEVICE AND PROCESSOR

This application is a continuation under 37 C.F.R. §1.60 of application Ser. No. 093,967, filed Jul. 21, 1993, now U.S. Pat. No. 5,396,055, which was a division of application Ser. No. 895,277 filed Jun. 8, 1992 (now U.S. Pat. No. 5,262,628 issued Nov. 16, 1993), which was a division of application Ser. No. 272,545 filed Nov. 17, 1988 (now U.S. Pat. No. 5,130,520, issued Jul. 14, 1992), which was a division of application Ser. No. 148,555, filed Jan. 26, 1988 (now U.S. Pat. No. 4,845,350 issued Jul. 4, 1989), which was a division of application Ser. No. 883,923, filed Jul. 10, 1986 (now U.S. Pat. No. 4,758,717 issued Jul. 19, 1988), which was a division of application Ser. No. 519,523, filed Aug. 1, 1983 (now U.S. Pat. No. 4,673,805 issued Jun. 16, 1987), which was a division of application Ser. No. 342,231, filed Jan. 25, 1982 (now U.S. Pat. No. 4,409,470 issued Oct. 11, 1983).

BACKGROUND OF THE INVENTION

1. Field of the Invention

The present invention generally relates to laser scanning systems for scanning, reading and/or analyzing bar code symbols and, more particularly, to a light-weight, easy-to-manipulate, non-arm-and-wrist-fatiguing, hand-held, narrow-bodied, single-and twin-windowed, laser scanning head supportable entirely by a user throughout the reading of the symbols. Still more particularly, this invention relates to a field-replaceable laser tube arrangement to permit rapid and easy tube replacement; to a novel laser tube and method of making the same; to an arrangement for, and method of, controlling a scanning system; to optical passive elements for increasing the depth of field; to a trigger protective device; and to a one-piece machinable or moldable plastic support bench and method of making the same.

2. Description of the Prior Art

Many industries, particularly the grocery and food processing industry, have begun to designate their products with a unique bar code symbol consisting of a series of lines and space of varying widths. Various bar code readers and laser scanning systems have been developed to decode the symbol pattern to a multiple digit representation for check-out and inventory purposes.

Aside from the conventional contact-type and non-contact-type wand or pen bar code readers, true laser scanners, such as point-of-sale or deck scanners of the moving-beam or fixed beam type, have been built into stationary counters. However, these deck scanners are large, massive, stationary installations. Some symbol-bearing objects are too heavy, or too big, or too inconvenient to be brought to the stationary scanning installation. Some objects may be stationary themselves.

In order to provide a mobile scanning system, semiportable laser scanning heads, such as disclosed in U.S. Pat. No. 4,251,798, were designed to permit the user to bring the scanning head to the object. However, such semi-portable heads weighed over three pounds, had to be partially supported by the object itself, and were too heavy and somewhat difficult to readily manipulate, particularly for those assembly-line applications where a user was routinely required to repetitively manipulate the semi-portable head many times per minute, every hour and on a daily basis.

More modern miniature laser scanners weighing on the order of two and one-half pounds, such as described in U.S. patent application Ser. No. 125,768 filed Feb. 29, 1980, (now U.S. Pat. No. 4,387,297) entitled "Portable Laser Scanning System and Scanning Methods," and assigned to the same assignee as the present application, have recently been proposed to provide a more truly portable laser scanning head which is supportable entirely by the user during the reading of the bar code symbols. Although generally satisfactory for its intended purpose, this fully portable head had a rather large case width due to the fact that the laser beam generated within the head was required to be swept over a wide field of view across the bar code symbol, which is located in the vicinity of a reference place located exteriorly of the housing. The swept laser beam, which was accommodated entirely in the wide-bodied head, therefore, required a great deal of "dead" space within the head. This "dead" space caused the case width to be unnecessarily large, and undesirably added to the overall size and weight of the head, thereby detracting somewhat from its features of ease of manipulation and full portability.

Another drawback of the wide-bodied head was that the case width increased from the rear towards the front of the head, as considered in the direction from the housing towards the reference plane, with the result that the front or nose of the head had a wide snout. In a preferred embodiment, the wide-bodied head had a gun-shaped configuration. It was desirable in some applications to insert the gun-shaped head, when not in use, into a user-supported holster of the kind traditionally used to receive and support firearms. However, the wide snout on the wide-bodied head did not lend itself to conveniently fit in the traditional gun holster. Hence, the wide-bodied heads were typically tossed and left on the nearest table, and were prone to being damaged, misplaced and lost.

Still another drawback associated with the semiportable and wide-bodied heads was that any dirt specks on the exit window through which the laser beam exited en route to the bar code symbol, affected the laser scan at the symbol. The greater the distance between the exit window and the symbol at the reference place, the less of a potential malfunction would result from dirt specks on the exit window. However, the known semi-portable and wide-bodied heads were too dirt-sensitive for some applications inasmuch as the exit window was too undesirably close to the reference plane.

Yet another drawback of the prior art laser scanning heads was that laser tube replacement generally required skilled personnel using specialized equipment. For example, in one technique, the replacement tube was mounted on a bracket which was then positioned by adjusting screws until the replacement tube was properly aligned with the optical system. This was time- and labor-consuming, and required a skilled technician. Another technique involved a mounting bracket on which the tube was pre-aligned. The bracket and the tube were changed together as an integral assembly. Although this technique allowed replacement by unskilled people, the tube still had to be initially aligned to the mounting bracket by a skilled technician. In both techniques, the output and non-output ends of the used laser tube had to be unsoldered from their respective electrical power wires, and thereupon, the output and non-output ends of the fresh tube had to be soldered to the respective electrical power wires. This soldering operation was likewise time- and labor-consuming, and required special tools which might or might not have been available at a given field installation.

The optical system of a laser scanner head generally used a negative lens at the output end of the laser tube to diverge the collimated laser beam, and thereupon, used a positive lens to focus the diverging laser beam to a spot of predetermined diameter at a reference plane located exteriorly of the head. The negative lens represented a component of given weight, size and cost, and in the context of a laser scanner head to be made as light-weight, miniature and inexpensive as possible, a component which it was desirable to eliminate.

SUMMARY OF THE INVENTION

1. Objects of the Invention

Accordingly, it is the general object of the present invention to overcome the aforementioned drawbacks of the prior art laser scanning heads.

Another object of this invention is to reduce the rather large case width heretofore required in prior art wide-bodied laser scanning heads.

Still another object of this invention is to eliminate the amount of dead space within the head.

Yet another object of this invention is to provide a laser scanning head which is so light-in-weight and small-in-volume, that it can be easily held in a user's hand without causing arm-and wrist-fatigue, while being easy-to-manipulate, even for those assembly-line applications where the user is routinely required to repetitively manipulate the head many times per minute, every hour, and on a daily basis.

An additional object of this invention is to provide a fully portable laser scanning head weighing on the order of one pound.

A further object of this invention is to eliminate the wide snout heretofore present on prior art wide-bodied laser scanning heads.

Still another object of this invention is to provide a narrow-bodied laser scanning head which can readily be received and supported in a traditional V-shaped gun holster, thereby preventing possible damage to, and misplacement and loss of, the head.

Yet another object of this invention is to prevent dirt specks on the laser exit window of the laser scanning head from adversely affecting the reading of the bar code symbol.

Another object of this invention is to automatically optically align the laser tube with the optic system during tube replacement without requiring skilled technicians or specialized equipment to effect the replacement.

Still another object of this invention is to replace the used laser tube in the head without requiring any desoldering or soldering of any electrical power wires.

Yet another object of this invention is to eliminate the negative lens of the optical system, and thereby reduce the overall weight, size and cost of the head.

A further object of this invention is to make the field of view of the incident laser beam traveling towards the symbol and/or the reflected laser beam traveling back from the symbol substantially independent of the case width of the head.

A further object of this invention is to provide a laser scanning head which is shock-resistant and resists twisting of the head.

Yet a further object of this invention is to minimize battery power drain by actuating all of the actuatable components in the laser scanning head only when they are operative to read and process the symbol, and by deactuating all of the actuatable components in the head after the symbol reading and processing has been concluded.

Still a further object of this invention is to independently actuate and deactuate all of the actuatable components in the laser scanning head by independently operable means on the head and remote therefrom.

Another object of this invention is to eliminate the electrical power and communications cable between the laser scanning head and the remainder of the scanning system.

Still another object of this invention is to provide a twin-windowed laser scanning head combining the advantages of optimum field of view for the incident laser beam, optimum field of view for the reflected laser beam, low spot speed scanning variation for the laser beam, low sensitivity to dirt specks on the laser beam exit or scanning window, highlight sensor effectiveness, each of judging scanning distance to the light sensor, and minimum case width.

2. Features of the Invention

In keeping with these objects and others which will be apparent hereinafter, one feature of the invention resides, briefly stated, in a scanning head of a scanning system for reading bar code symbols. The head is preferably of lightweight, narrow-bodied, easy-to-manipulate, non-arm-and-wrist fatiguing, and is hand-held and supportable entirely by a user during symbol reading. The head has an elongated body portion and includes a front region, a rear region, and an intermediate body region extending between the front and rear regions. The head has a predetermined width defined by a pair of opposing side walls spaced transversely apart of each other. In a preferred embodiment, the hand-held head has a gun-shaped housing, and has a handle portion mounted below the body portion.

The head includes a light source means, e.g. a miniature laser tube or a semiconductor laser diode, mounted within the head, for generating an incident light beam. Optic means, e.g. an optical train consisting of at least one lens and light-reflecting mirrors, is also mounted within the head, and is operative for directing the incident beam along a light path towards a reference plane located exteriorly of the housing in the vicinity of the front region thereof, and also towards a bar code symbol located in the vicinity of the reference plane. A reflected light beam is reflected off the symbol, and is directed along a light path away from the reference plane and back towards the housing.

The head further includes scanning means, e.g. a miniature high-speed scanning motor or a miniature mirrored polygon, mounted within the head at the rear region thereof, for sweeping at least one of the beams, i.e. either the incident beam, or the reflected beam, or both, over a field of view across the bar code symbol. Sensor means, e.g. a pair of miniature photodiodes, is also mounted within the head, for detecting the light intensity in the reflected beam over a field of view across the bar code symbol, and for generating an electrical analog signal indicative of the detected light intensity. Signal processing means, e.g. analog-to-digital processing circuitry, is also mounted within the head, for processing the analog signal into a digitized signal to generate therefrom data descriptive of the bar code symbol.

In accordance with this invention, window means is mounted on the housing, and in a broad aspect of this invention, a single light-transmissive window is mounted at the rear region of the head in close adjacent confronting relationship with the scanning means thereat. The window is configured and positioned in the light path of the swept beam, i.e., either the incident beam, or the reflected beam, or both, to permit the swept beam to pass through the window and unobstructedly travel exteriorly of and past the front and intermediate body regions of the housing.

Due to the exterior transmission of the swept beam outside of the front and intermediate body regions of the housing, the field of view of the swept beam is substantially independent of the width of the housing. Put another way, the angular distance through which the incident and/or reflected beams are swept is no longer a function of the width of the housing. The incident and/or reflected beams can now be swept over an angular distance which is greater than the housing width. Furthermore, the angular distance through which the incident and/or reflected beams are swept can be maintained at the industrial standard, and the width of the housing can be made much narrower in comparison to prior art wide-bodied designs. The amount of dead space within the head has been significantly reduced. The overall size and weight of the head is likewise much reduced, thereby further contributing to the full portability and ease of manipulation features of this invention. The designer of miniaturized laser scanning heads is no longer restricted to wide-bodied head configurations.

Similarly, the wide snout at the front of the prior art heads is no longer a design restraint. The narrow-bodied and streamlined design of the head of this invention can readily be received and supported in a traditional V-shaped gun holster, thereby preventing possible damage to, and misplacement and loss of, the head.

In one preferred embodiment, the window at the rear region of the head adjacent the scanning means constitutes a scan window through which the incident beam passes en route to the bar code symbol. Another light-transmissive non-scan window is mounted at the front region of the head in close adjacent confronting relationship with the sensor means also located thereat. The non-scan window is configured and positioned in the light path of the reflected beam to permit the latter to pass therethrough to the sensor means. In this twin-windowed embodiment, the closeness of the scan window relative to the scanning means maximizes the field of view of the incident beam; and the closeness of the non-scan window relative to the sensor means maximizes the field of view of the reflected beam, and increases the light sensor signal. The scan window is advantageously located further from the reference plane and the front region of the housing as compared to the location of the non-scan window. This rearward mounting of the scan window helps to minimize the effect of dirt specks on the scan window.

In another twin-windowed embodiment, a reversal of parts causes the rear scan window to be positioned in the light path of the reflected beam, whereas the front non-scan window is positioned in the light path of the incident beam. In this embodiment, the light source is mounted at the front of the head in close adjacent confronting relationship with the non-scan window located thereat. The scanning means remains at the rear of the head adjacent the scan window. In operation, the light source illuminates the symbol, and the reflected beam travels unobstructedly and exteriorly of and past the front and intermediate body regions of the head. The scanning means sweeps the reflected beam and, in turn, directs the swept beam to the sensor means for further processing.

In still another preferred embodiment, only a single window is mounted at the rear of the head in close adjacent confronting relationship with the scanning means thereat. The single window is configured and positioned in the light paths of both the swept incident and reflected beams to permit both beams to pass through the window and unobstructedly travel exteriorly of and past the front and intermediate body regions of the head. This retro-reflective scanning is advantageous in some applications, because it eliminates the need for the second window, as described in the earlier twin-windowed embodiments.

Yet another feature of this invention resides in a field-replaceable laser tube arrangement which automatically optically aligns the laser tube with the optical system of the head during tube replacement without requiring skilled technicians or specialized equipment to effect the replacement, and without requiring any desoldering or soldering of any electrical power wires.

An additional feature of this invention resides in eliminating the negative lens of the optical system by modifying the laser tube of the head to have diverging output laser beam. In prior art designs, the output beam of the laser tube was collimated, i.e. had a substantially flat wavefront. It was necessary therefore to use a negative lens to diverge the collimated laser beam, and thereupon, to use a positive lens to focus the diverging laser beam to a circular spot of predetermined diameter at the reference plane. However, by modifying the laser tube to have a diverging output beam, the negative lens and its attendant weight, size, space requirements and cost aspects are eliminated, thereby contributing to the overall portability of the head.

Still other features relate to increasing the depth of field by using optical passive elements rather than electronic circuitry, minimizing battery drain by actuating the components in the head only when the symbol is being read, and fabricating an optical support bench by mass-production techniques.

The novel features which are considered as characteristics of the invention are set forth in particular in the appended claims. The invention itself, however, both as to its construction and its method of operation, together with additional object and advantages thereof, will be best understood from the following description of specific embodiments when read in connection with the accompanying drawings.

BRIEF DESCRIPTION OF THE DRAWINGS

FIG. 1 is a side sectional view of a gun-shaped, narrow-bodied, twin-windowed embodiment of a laser tube-based portable laser scanning head in accordance with this invention;

FIG. 3 is a rear sectional view as taken along line 3—3 of FIG. 1;

FIG. 4 is a top plan sectional view of a detail of the embodiment of FIG. 1, showing the laser tube and part of the optical train;

FIG. 5 is a front elevational view of the embodiment of FIG. 1;

FIG. 6 is a front perspective view of the FIG. 1 embodiment, on a much smaller scale, and diagrammatically shows the interconnection of the head to the remainder of the scanning system;

FIG. 8 is a side sectional view of a gun-shaped, narrow-bodied, twin-windowed embodiment of a laser diode-based portable laser scanning head in accordance with this invention;

FIG. 9 is a partially sectioned, top plan view of the embodiment of FIG. 8;

DETAILED DESCRIPTION OF THE PREFERRED EMBODIMENTS

Figure 2:
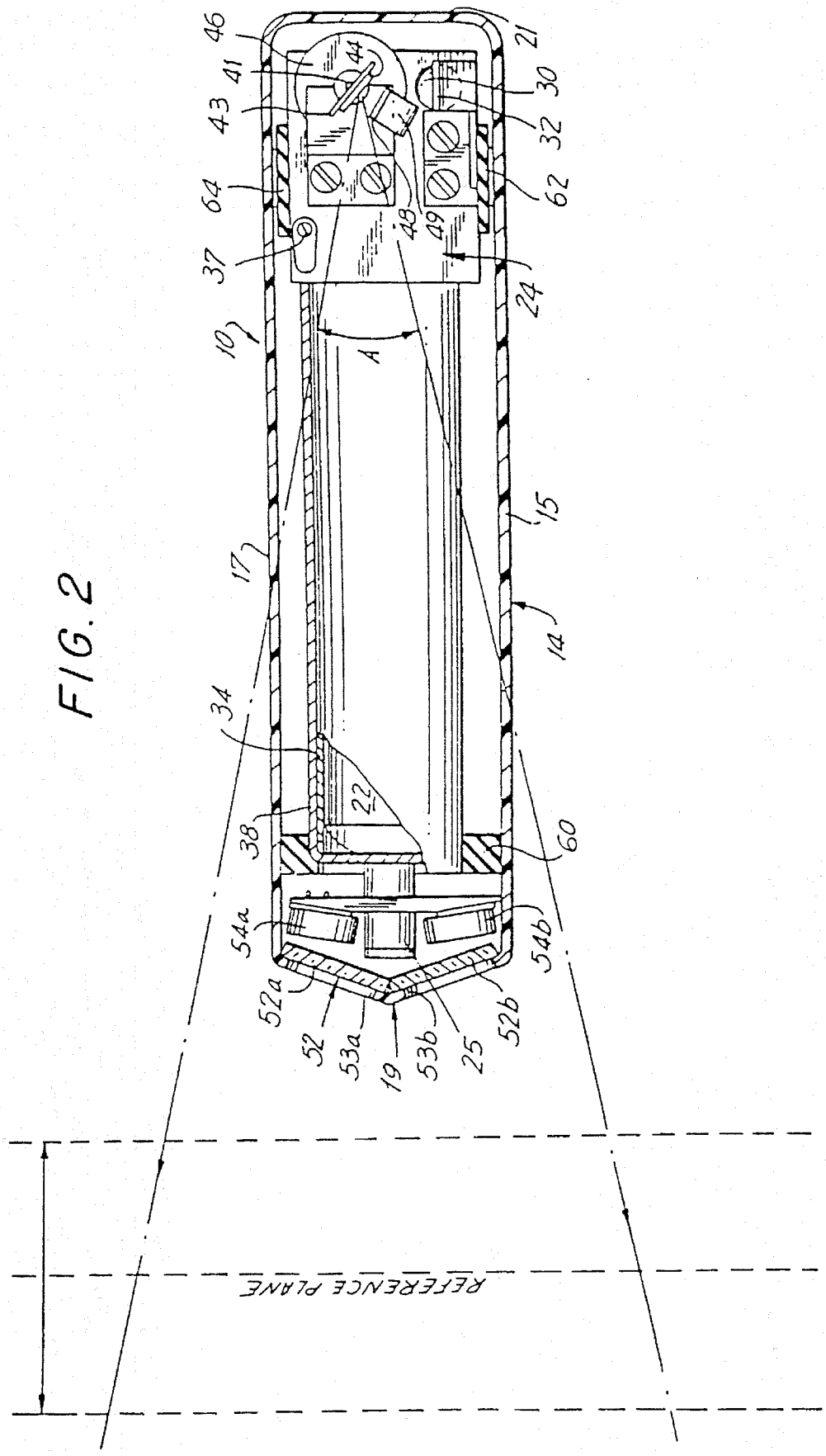
FIG. 2 is a partially broken-away, top sectional view of the embodiment of FIG. 1.

Referring now to FIGS. 1–6 of the drawings, reference numeral 10 generally identifies a light-weight, narrow-bodied, streamlined, narrow-snouted, hand-held, fully portable, easy-to-manipulate, non-arm-and-wrist-fatiguing, twin-windowed laser scanning head supportable entirely by a user for use in a laser scanning system operative for reading, scanning and/or analyzing bar code symbols throughout the reading thereof. Such symbols comprise a series of lines and spaces of varying widths, which pattern decodes to a multiple-digit representation characteristic of the product bearing the symbol. Typical symbol bar codes in current use are the Universal Product Code (UPC), EAN, Codabar and Code 39.

Turning now to FIG. 1, the head 10 includes a generally gun-shaped housing having a handle portion 12 and an elongated, narrow-bodied barrel or body portion 14. The handle portion 12 has a cross-sectional dimension and overall size such that it can conveniently fit in the palm of a user's hand. Both the body and handle portions are constituted of a light-weight, resilient, shock-resistant, self-supporting material, such as a synthetic plastic material. The plastic housing is preferably injection-molded, but can be vacuum-formed or blow-molded to form a thin shell which is hollow and bounds an interior space whose volume measures less than a value which is on the order of 50 cubic inches. The specific value of 50 cubic inches is not intended to be self-limiting, but has been provided merely to give an approximation of the overall maximum volume and size of the head 10. The overall volume can be less than 50 cubic inches and, indeed, in some applications, the volume is on the order of 25 cubic inches.

The body portion 14 is generally horizontally elongated along a longitudinal axis, and has a front region 16 at the front end, a raised rear region 18 at the rear end, and in intermediate body region 20 extending between the front and rear regions. The body portion 14 has a top wall 11 above which the raised rear region 18 projects, a bottom wall 13 below the top wall, a pair of opposed side walls 15, 17 spaced transversely apart of each other by a predetermined width dimension, a front wall or nose 19, and a rear wall 21 spaced rearwardly of the front wall.

A light source means, i.e., laserstube 22 having an anode or output end 23 (see FIG. 4) and a cathode or non-output end 25, is mounted within the body portion 14 lengthwise along the longitudinal axis, and is operative for generating an incident collimated laser beam. An optic means, i.e., an optic train, is likewise mounted within the body portion, and is operative for directing the incident beam along a light path towards a reference plane located exteriorly of the housing in the vicinity of the front region 16, as shown in FIGS. 1 and 2. A bar code symbol to be read is located in the vicinity of the reference plane, that is, anywhere within the depth of focus of the incident beam as described below, and the light reflected from the symbol constitutes a reflected laser beam which is directed along a light path away from the reference plane and back towards the housing.

As best shown in FIGS. 4 and 5, the optic train includes an optical bench 24, a negative or concave lens 26 which is fixedly mounted in a cylindrical bore 25 of the bench, a light-reflecting mirror 26' which is fixedly mounted on an inclined surface 27 of the bench, another light-reflecting mirror 28 which is fixedly mounted on another inclined surface 29 of the bench, a positive or convex lens 30 which is adjustably mounted on the bench by means of a set screw 31, and still another light-reflecting mirror 32 which is adjustably mounted on a bendable metal bracket 33.

The optical bench 24 has an enlarged cylindrical recess 35 which communicates with the smaller bore 25. The laser tube 22 is snugly received in a cylindrical support sleeve 34 which, in turn, is snugly received in the bore 25. An electrically conductive element or washer 36 is located at the shoulder between the recess 35 and bore 25. The washer 36 makes an electro-mechanical, non-soldered contact with the output end 23 of the tube. Another electrically conductive element, preferably a resilient wire 38, is mounted at the non-output end 25 of the tube. The wire 38 has one coiled end looped around the non-output end 25, an intermediate taut wire portion extending lengthwise of the tube, and its other end is fixedly secured to the bench 24 by the set screw 37. The wire 38 is preferably made of a resilient, spring-like material, and its tautness functions much like a spring or biasing means for affirmatively urging the output end 23 into affirmative, electro-mechanical contact with the washer 36. The non-output end 25 is grounded via the wire 38; and a high voltage power wire (not shown) from the power supply component 40 mounted in the handle portion 12 is electrically connected to a ballast resistor 42 mounted in another bore formed in the bench 24. The ballast resistor is, in turn, electrically connected to the washer 36 by a wire, not illustrated for the sake of clarity. It will be noted that neither the output nor non-output end of the tube is directly soldered to any electrical wire, a feature which is highly desirable in effecting on-site tube replacement. The bore 25 and recess 35 are mechanically bore-sighted so that the laser output beam is automatically optically aligned with the optic train when the sleeve-supported tube and output end are fully inserted into the recess 35 and bore 25, respectively.

The bench 24 is a one-piece light-weight part machined or preferably molded by inexpensive mass-production techniques of a dimensionally stable, flame-retardant material, such as Delrin (Trademark), or glass-filled Noryl (Trademark), preferably having a high dielectric breakdown (on the order of 500 volts/mil). In order to take into account the slight variations in beam alignment which unavoidably result from different tubes and from tolerance variations in the tube itself, the bore 25, and the recess 35, the very weak negative lens 26 (on the order of −24 mm) is mounted very close to the output end of the tube, and all the elements in the optical path are made large enough to allow the beam to pass unobstructedly even if the beam is not exactly on center. The close mounting of the weak lens 26, and the short optical path (about 38 mm) between lenses 26 and 30, mean that the optical tolerances in the remainder of the beam path can still be off by about ½° without sacrificing system performance. This provides the advantage that the bench can be Thus the beam emitted from the output end 23 first passes through the negative lens 26 which functions to diverge the initially collimated beam. Then, the divergent beam impinges the mirror 26, and is thereupon reflected laterally to impinge the mirror 28, whereupon the beam is reflected upwardly to pass through the positive lens 30 which is operative to converge the divergent beam to a generally circular spot of approximately an 8 mil to 10 mil diameter at the reference plane. The spot size remains approximately constant throughout the depth of focus at either side of the reference plane. The converging beam from the lens 30 impinges on the adjustable mirror 32, and is thereupon laterally reflected to a scanning mirror 44 which forms part of the scanning means.

The scanning means is preferably a high-speed scanner motor 46 of the type shown and described in co-pending U.S. application Ser. No. 125,768, filed Feb. 29, 1980, entitled "Portable Laser Scanning System and Scanning Methods," and assigned to the same assignee as the present application. The entire contents of said application are incorporated herein by reference now U.S. Pat. No. 4,387,297, and made part of this application. For purposes of this patent, it is sufficient to point out that the scanner motor 46 has an output shaft 41 on which a support plate 43 is fixedly mounted. The scanning mirror 44 is fixedly mounted on the plate 43. The motor 46 is driven to reciprocally and repetitively oscillate the shaft in alternate circumferential directions over arc lengths of any desired size, typically less than 360°, and at a rate of speed on the order of a plurality of oscillations per second. In a preferred embodiment of this invention, the scanning mirror 44 and the shaft are jointly oscillated so that the scanning mirror repetitively sweeps the beam impinging thereon through an angular distance A or an arc length of about 25° and at a rate of about 40 oscillations per second.

Stop means, i.e., an abutment 48, is fixedly mounted on a bracket 49 which is, in turn, mounted on the bench 24. The abutment 48 is located in the path of oscillating movement of the plate 43 for the scanning mirror 44, for preventing the mirror from making a complete 360° rotation during shipping. The abutment never strikes the mirror during scanning; the abutment serves to keep the mirror properly aligned, that is, always facing towards the front of the head.

The scanning motor 46 is mounted on the bench 24 slightly offset from the longitudinal axis. Other miniature polygons driven by motors can be used, or the various bimorph scanning oscillating elements described in U.S. Pat. No. 251,798 can be used, or the penta-bimorph element described in U.S. Pat. No. 4,387,297, can be used, or the miniature polygon element described in co-pending U.S. patent application Ser. No. 133,945, filed Mar. 25, 1980, entitled "Portable Stand-Alone Desk-Top Laser Scanning Workstation For Intelligent Data Acquisition Terminal and Method of Scanning," now U.S. Pat. No. 4,369,361 and assigned to the same assignee as the present application, the entire contents of which are hereby incorporated herein by reference and made part of this disclosure, can be used.

Although only a single scanner element is shown in the drawings for cyclically sweeping the laser beam across the symbol along a predetermined direction (X-axis scanning) lengthwise thereof, it will be understood that another scanner element may be mounted in the head for sweeping the symbol along a transverse direction (Y-axis scanning) which is substantially orthogonal to the predetermined direction. In some applications, multiple line scanning is preferred.

Referring again to FIGS. 1 and 2, the scanning mirror 44 is mounted in the light path of the incident beam at the rear region 18 of the head, and the motor 46 is operative for cyclically sweeping the incident beam through an angular distance A over a field of view across the bar code symbol located in the vicinity of the reference plane. A laser light-transmissive scan window 50 is mounted on the raised rear region 18, behind an opening 51 formed therein in close adjacent confronting relationship with the scanning mirror 44 thereat. As used throughout the specification and claims herein, the term "close adjacent confronting" relationship between components is defined to mean that one component is proximally located relative to the other component, typically less than one inch apart of each other. As shown in FIG. 1, the scan window 50 is configured and positioned in the light path of the incident beam to permit the latter coming from the scanning mirror 44 to travel a distance of less than one inch within the raised rear region 18, and then to pass through the scan window 50, and thereupon to travel unobstructedly and exteriorly of and past the intermediate body region 20 and the front region 16 of the housing, and then to impinge on the symbol located at or near the reference plane.

The closer the scanning mirror 44 is to the scan window 50, the larger will be the field of view of the swept incident beam for a given scan angle. It will be noted that the width dimension of the scan window represents a limiting factor for the sweep of the incident beam, because the housing walls bounding the scan window would clip and block any beam which was swept beyond the width of the scan window. Hence, as a rule, the scanning mirror is made as close as possible to the scan window to optimize the field of view of the swept incident beam.

As best shown in FIG. 2, the field of view of the swept incident beam is substantially independent of the width of the body portion 14 and, in fact, the field of view, i.e., the transverse beam sweep dimension, of the swept incident beam is actually larger than the width of the body portion 14 at the front region 16 and at the forward section of the intermediate body region 20. This is, of course, enabled by the fact that the swept incident beam has been transmitted outside of the front and intermediate body regions of the housing. The side walls 15, 17 are not in the light path and do not clip or block the swept incident beam. The scan window 50 is mounted on the rear region 18 at an elevation above the top wall 11 to permit an overhead unobstructed transmission.

In a preferred embodiment, the width of the body portion 14 is on the order of 1¾ inches, whereas the width of the field of view at the reference plane is on the order of 3½ inches. In prior art wide-bodied designs, the width of the housing was greater than inches in order to obtain a 3½ inch width of the field of view for a given scan angle. Hence, the exterior transmission of the swept incident beam permits the head of the present invention to have a narrow-bodied streamlined configuration. The side walls 15, 17 need no longer diverge outwardly towards the front as in prior art designs to accommodate the swept beam, but can be made substantially parallel as shown, or in any other shape as desired.

In a preferred embodiment, the reference plane is located about 2 inches from the front wall 19 of the head, and is located in linear distance of about 9⅔ inches from the positive lens 30. The depth of field at the reference plane is about 2¾ on either side of the reference plane. These numerical figures are not intended to be self-limiting, but are merely exemplary.

A laser light-transmissive non-scan window 52 is mounted on the front wall 19 in close adjacent confronting relationship with the sensor means 54 located at the front region 16. The sensor means 54 is operative for detecting the intensity of the light in the reflected beam coming from the symbol over a field of view across the same, and for generating an electrical analog signal indicative of the detected light intensity. In order to increase the zone of coverage of the sensor means, a pair of sensor elements or photo diodes 54a, 54b are located on opposite sides of the longitudinal axis. The sensor elements lie in intersecting planes and face both forwardly and laterally. The front wall 19 is likewise constituted of a pair of tapered wall portions 19a, 19b, each of which has an opening 53a, 53b formed therein. A pair of non-scan window portions 52a, 52b is fixedly mounted behind the openings 52a, 52b, respectively. Each non-scan window portion is mounted in close adjacent confronting relationship with its respective sensor element. The non-scan window portions are configured and positioned in the light path of the reflected beam to permit the latter to pass therethrough to the sensor elements. Two small non-scan window portions are preferably utilized, rather than a single non-scan window, because two smaller windows are inherently stronger than one due to the greater perimeter that two windows provide.

The scan window 50 is located rearwardly of the non-scan window 52. Each window 50, 52 is located at a different distance from the reference plane and the front wall 19. The scan window 50 is elevated above the non-scan window 52, as described above. The non-scan window portions are located at opposite sides of the longitudinal axis. The scan window is located on the longitudinal axis.

A printed circuit board 59 is mounted within the body portion 14, and various electrical sub-circuits diagrammatically represented by reference numerals 55, 56, 57, 58 are provided on the board 59. Signal processing means 55 is operative to process the analog signal generated by the sensor elements to a digitized signal to generate therefrom data descriptive of the bar code symbol. Suitable signal processing means for this purpose was described in U.S. Pat. No. 4,251,798. Sub-circuit 56 constitutes drive circuitry for the scanner motor 46. Suitable motor drive circuitry for this purpose was described in U.S. Pat. No. 4,387,297. aforementioned co-pending application Ser. No. 125,768. Sub-circuits 57 and 58 constitute a safety circuit for the laser tube, and voltage regulator circuitry. Suitable circuitry for this purpose were also described in U.S. Pat. No. 4,387,297.

Shock mounting means are mounted at the front and rear regions of the body portion, for shock mounting the laser, optical and scanning components within the body portion. An annular shock collar 60, preferably of rubber material, surrounds the forward end of the tube 22 and engages the bottom wall 13 and the underside of the circuit board 59. Board support elements 61a, 61b extend downwardly of the top wall 11 to rigidly support the circuit board 59. A pair of rubber shock mounts 62, 64 are fixedly mounted on opposite sides of the optical bench 24, and respectively engage the side walls 15, 17 at the rear region 18 of the housing. The shock mounts 62, 64 and the collar 60 are spaced longitudinally apart of each other and engage the thin-walled housing at three spaced locations to isolate twisting of the housing from the laser optical and scanning components.

Electrical power is supplied to the laser tube 22 by the power supply component 40 mounted within the handle portion 12. The power supply component which steps up a 12 vDC battery voltage to over 1 kilovolt is the heaviest component in the head, and its mounting in the handle portion allows for a low center of gravity and for better balance of the head.

A non-bulky, collapsible, coil-type cable 66 (see FIG. 6) electrically connects the head 10 to the remainder of the scanning system, which includes a battery-powered decode module 68 and a host computer 70. The coil-type cable 66 is readily flexible and permits user manipulation of the head 10 with multiple freedoms of movement from one symbol to the next without requiring excessive strength by the user. The cable 66 includes a plurality of conductive wires which are all relatively thin and flexible. For example, one wire carries the 12 vDC low voltage signal from the battery in the decode module 68 to the power component 40. Another wire carries the digitized signal from the analog-to-digital signal processing circuitry 55 to the decode module 68 for decoding purposes. This latter wire is non-radio-frequency-shielded, and hence, is readily flexible. The remaining wires carry low voltage control and communication signals. All of the wires of the cable 66 are connected together to a common plug-type connector 72. A mating connector 74 is mounted within the head, and receives the connector 72 in a mating relationship. The use of the mating connectors 72, 74 permits rapid replacement of the cable for on-site repairs. The electrical connections between the connector 74 and the various components in the head have been omitted from the drawings for the sake of clarity.

The decode module 68 processes the digitized signal generated in the head, and calculates the desired data, e.g. the multiple digit representation or code of the bar code symbol, in accordance with an algorithm contained in a software program. The decode module 68 includes a PROM for holding the control program, a RAM for temporary data storage, and a microprocessor which controls the PROM and RAM and does the desired calculations. The decode module also includes control circuitry for controlling the actuatable components in the head as described below, as well as two-way communications circuitry for communicating with the head and/or with the host computer 70. The host computer 70 is essentially a large data base, and provides information for the decoded symbol. For example, the host computer can provide retail price information corresponding to the decoded symbols.

A manually-actuatable trigger switch 76 is mounted on the head in the region where the handle portion 12 is joined to the body portion 14. Depression of the trigger switch 76 is operative to turn the microprocessor in the decode module on. Upon release of the trigger switch, the spring 78 restores the switch to its initial position, and the microprocessor is turned off. In turn, the microprocessor is electrically connected to the actuatable components in the head via the cable 66 to actuate and deactuate the actuatable components when the microprocessor is respectively turned on or off by the trigger switch.

In prior art heads, the trigger switch was only operative to turn the laser tube and/or scanner motor on or off. Now, the trigger switch turns the microprocessor on or off and, in turn, all of the actuatable components in the head on or off. The microprocessor is a large power drain on the battery built into the decode module. Hence, by controlling the on-time of the microprocessor to only those times when a symbol is being read, that is, when the trigger switch is depressed, the power drain is substantially reduced, and the battery life substantially increased (over 5 hours).

Another feature of this invention is embodied in turning the microprocessor on or off by means of the host computer 70 which is remote from the head 10. The computer 70 typically includes a keyboard and a display. Once a user makes an entry on the keyboard for example, by entering the identity of the code to be decoded, the computer requests the microprocessor to turn itself on, store the information, and then to turn the microprocessor off. The microprocessor, again, is on only for so long as is necessary to comply with the computer request. The trigger switch and the keyboard computer entry are independently operable means for directly controlling the microprocessor, and for indirectly controlling the actuatable components in the head.

Another useful feature in having the microprocessor, rather than the trigger switch, directly control the laser tube is to keep an accurate record of laser on-time for governmental recordkeeping. It is, of course, far easier to keep track of laser on-time in the software of a microprocessor than to manually record the laser on-time.

A set of visual indicators or lamps 80, 82, 84 is also mounted on the circuit board 59, each lamp being positioned below a corresponding opening in the top wall 11. The lamps are operative to visually indicate to the user the status of the scanning system. For example, lamp 80 illuminates whenever the laser tube is energized, thereby continuously advising the user whether the tube is on or off. Lamp 82 illuminates when a successful decode has been obtained. It will be recalled that the incident beam is swept over a symbol at a rate of about 40 scan per second. The reflected beam may be successfully decoded on the first scan, or on any of the successive scans. Whenever a successful scan has been obtained, the microprocessor will cause the lamp 82 to be illuminated to advise the user that the head is ready to read another symbol.

It is believed that the operation of the scanning system is self-evident from the foregoing, but by way of brief review, the gun-shaped head is grasped by its handle portion, and its barrel is aimed at the bar code symbol to be read. The sighting of the symbol is facilitated by the fact that the barrel is narrow-bodied, and that there are no obstructions on the front and intermediate body regions of the barrel. The front wall of the barrel is situated close to the symbol, it being understood that the symbol can be located anywhere in the depth of field at either side of the reference plane.

The trigger switch is then depressed, thereby causing the microprocessor to energize the laser tube, the scanner motor, the sensor elements, and all the electronic circuitry provided on the printed circuit board. The laser tube emits a beam, which is then routed through the optic train as described above, and thereupon, the scanning mirror reflects the beam through the scan window and out of the head exteriorly of and past the front and intermediate body regions of the body portion of the head. The reflected beam passes through the non-scan window portions to the sensor elements and is subsequently processed by the signal processing circuitry. The processed signal is conducted to the decode module for decoding. Once a successful decode has been realized, the microprocessor illuminates the lamp 82 and deactuates the head, and the user is now advised that the head is ready to be aimed at another symbol. The flexibility of the coil-type cable facilitates the movement of the head to the next symbol.

In addition, the movement of the head from one symbol to the next is facilitated by the relatively low weight of the head. The head with all the aforementioned components therein weighs less than one pound. This represents a significant breakthrough in the art of miniaturized and portable laser scanning heads.

Figure 7A:
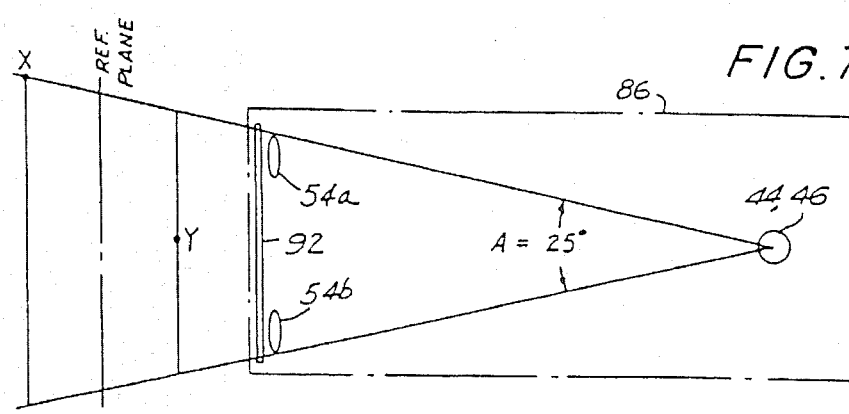
FIG. 7A is a top plan schematic view of a prior art wide-bodied head.
Figure 7B:
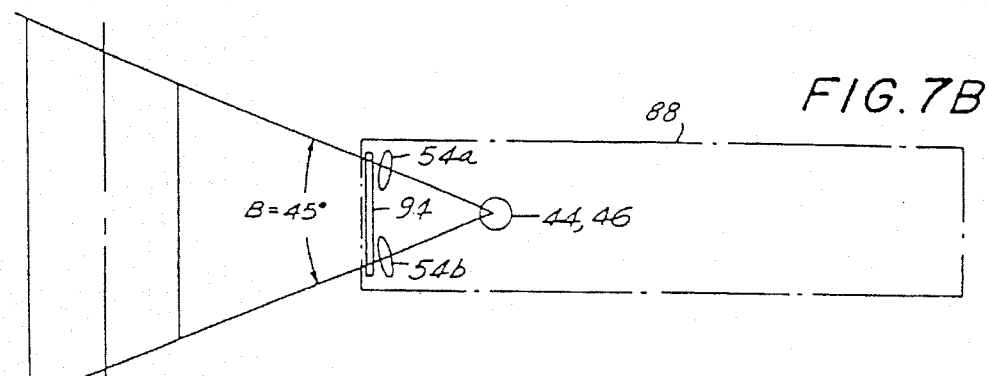
FIG. 7B is a top plan schematic view of an alternate, but unacceptable, design of a laser scanning head.
Figure 7C:
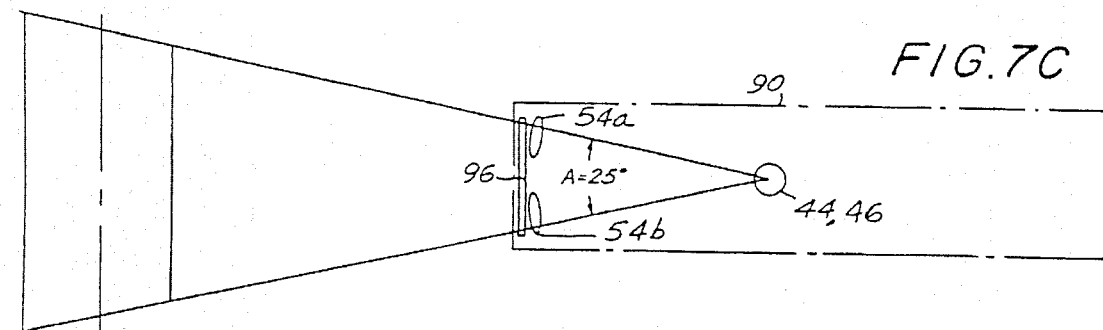
FIG. 7C is a top plan schematic view of another alternate, but unacceptable, design of a laser scanning head.
Figure 7D:
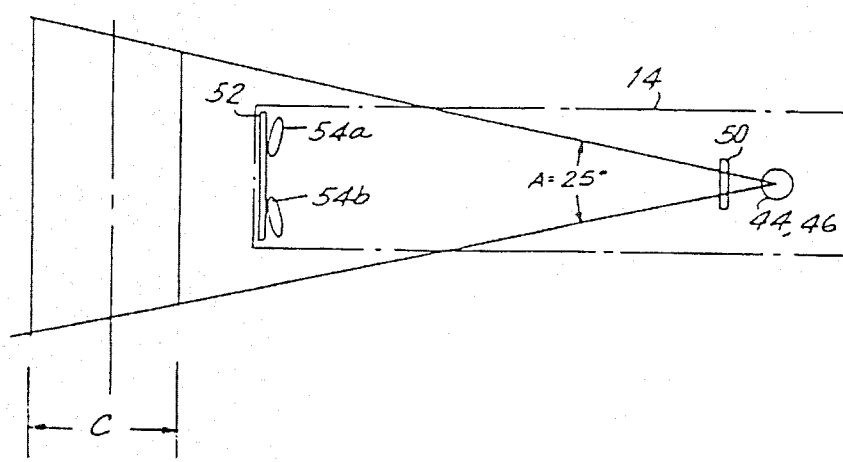
FIG. 7D is a top plan schematic view of the laser scanning head of FIG. 1.

The twin-windowed head (the pair of non-scan window portions 52a, 52b constitutes one non-scan window 52; the scan window 50 constitutes the other window) with the rear, raised scan window 50 overcomes several problems associated with the prior art heads. To facilitate the explanation of these problems and how the twin-windowed head of this invention solves these problems, the top plan schematic views of FIGS. 7A, 7B, 7C, 7D have been provided. FIG. 7A diagrammatically illustrates a prior art wide-bodied head of the type shown in the aforementioned copending application U.S. Ser. No. 125,768, now U.S. Pat. No. 4,386,297. FIGS. 7B and 7C diagrammatically illustrate some head design alternatives, but which are unacceptable, because they fail to solve all of the prior art problems. FIG. 7D diagrammatically illustrates the narrow-bodied, twin-windowed head of the present invention, as previously described in FIGS. 1-6.

FIGS. 7A shows an elongated body portion or barrel 86 having a rear scanning means 44, 46, as described above, operative to sweep an incident beam through a scan angle A of predetermined arc length, e.g., 25°, through a single front window 92. The reflected beam also passes through the front window 92 to be detected by the sensor elements 54a, 54b, also described above. The barrel is relatively wide-bodied to accommodate the swept incident beam within the barrel, and the front of the housing is relatively close to the reference plane.

As compared to FIG. 7A, FIG. 7B shows a narrower barrel 88 having a more forwardly scanning means 44, 46 operative for sweeping the incident beam through a larger scan angle B, e.g. on the order of 45°, through a single front window 94. The reflected beam also passes through the front window to be detected by the sensor elements 54a, 54b. The front of the housing is spaced further from the reference plane.

As compared to FIG. 7B, the scanning means 44, 46 in FIG. 7C is located near the middle of the barrel 90, and is operative to sweep the incident bean through the original 25° scan angle through the single front window 96. The reflected beam also passes through the front window for detection by the sensor elements 54a, 54b. The front of the housing is spaced much further from the reference plane.

FIG. 7D needs no detailed description, except to repeat that the rear scanning means 44, 46 has its scan window 50 rearwardly located on the housing. The scan window 50 is raised so that the swept incident beam is not accommodated within the barrel 14. The reflected beam passes through a different window, i.e., the non-scan window 52 located at the front of the barrel.

In rating the performance of a laser scanning head, the spot speed variation of the scan across the symbol should ideally be constant so that the signal processing circuitry can be simple, i.e., without requiring sophisticated circuitry to compensate for the spot speed variation. By way of example, the spot speed at point X in the depth of field C is much greater than the spot speed at point Y. It is well known that the lower the scan angle A, the lower will be the projected spot speed variation. Hence, a 25° scan angle as illustrated in FIGS. 7A, 7C, 7D is better in terms of spot speed variation than the 45° scan angle of FIG. 7B.

As noted above, the problem of dirt specks on the scan or exit window adversely affects the scanning ability, particularly where the window is positioned in the light path where the scan spot is focused and relatively small. Hence, the greater the spot size and concomitantly the greater the distance between the exit window and the reference plane, the better the scanning performance. Hence, the head of FIG. 7D with its rear exit window 50 the furthest from the reference plane has the least sensitivity to dirt specks, and the heads of FIGS. 7C, 7B, 7A are successively more sensitive to dirt specks.

In terms of light sensor effectiveness, the closer the sensor elements are to the reference plane, the more sensitive will be the detection by the sensor elements. Hence, the heads of FIGS. 7D and 7A have the best light sensitivity; the head of FIG. 7B has less light sensitivity; and the head of FIG. 7C has the worst light sensitivity.

In operation, it is easier for a user to gauge a working distance close to the head, rather than a working distance located far therefrom. Typically, it is easier for the user to aim the head at a symbol located, for example, anywhere between ¼" and 6" away from the front wall of the barrel, rather than aim the head at a symbol located, for example, between 9" and 12" from the front wall. Hence, the heads of FIGS. 7D and 7A are the best in terms of user convenience; the head of FIG. 7B is less convenient; and the head of FIG. 7C is the most inconvenient.

Of greater importance is the effect that the barrel width has on the width of the scan. As shown in FIG. 7A, the entire width of the scan must be accommodated in the barrel 86, thereby resulting in a wide-bodied, unaesthetic design. If the scanner means is moved forwardly as shown in FIG. 7B so as to narrow the width of the barrel, then the scan angle must be increased to obtain the same field of view. As noted above, increasing the scan angle is not an acceptable solution, because it worsens the spot speed variation performance. If the scanner means is moved rearwardly back towards the middle of the barrel, and the scan angle is kept at its original arc length, and the body is kept narrow, as shown in FIG. 7C, then the light sensor effectiveness will worsen, and the convenient judgment of scan distance will worsen.

In a non-retro-reflective mode, the applicants have recognized that the use of a single front window through which the incident and reflected beams must pass has conflicting requirements. By providing a rear window and a front window for the beams, these conflicting requirements are resolved. The head of FIG. 7D has the best insensitivity to dirt specks on the exit window, has the narrowest barrel width, and has optimum control over spot speed variation, optimum ease of judging scan distance, and optimum light sensor effectiveness.

In accordance with the invention, the housing need only be large enough to accommodate the components. This benefits styling, cost and weight. The scan width may be varied from one application to the next without making a change in the barrel. By mounting the scanning means close to the rear scan window, the field of view of the incident beam is made very wide. Analogously, by mounting the sensor means close to the front non-scan window, the field of view of the reflected beam is made very wide. Furthermore, the close mounting of the scanning and sensor means to their respective windows, eliminates the prior art narrow slit aperture, and eases optical alignment of the incident beam, and avoids potential clipping of the incident beam if the beam angle drifts.

Referring now to FIGS. 8 and 9, the gun-shaped head 100 is essentially analogous to the head 10, except as noted below. Hence, any like components in FIGS. 8 and 9 have been identified with the same reference numerals as were used previously. Rather than a laser tube, a semiconductor laser diode 102 is mounted within the barrel 14 to generate an incident laser beam. Rather than a folded path optical train, an optics tube 104 is axially aligned with the laser diode. A light-reflecting mirror 106 is adjustably mounted on a bendable bracket 108 that is mounted on the exterior of the tube 104. The mirror 106 is positioned in the light path of the incident beam to direct the incident beam towards the scanning mirror 44 of the scanner motor 46. As described previously, the motor 46 is operative to sweep the incident beam through the rear scan window 50 and outside of the barrel 14 past the intermediate body region 20 and front region 16 thereof. The reflected beam passes through the non-scan window 52 to the sensor means 54 for detection and subsequent processing as previously described.

A keyboard 110 and a display 112 are mounted on the top wall 11 of the barrel. The keyboard 110 comprises a plurality of manually-depressible keys, each for a different numeral, and a set of function keys to calculate and display various functions required in a given application. The display 112 may be of the low power LCD type. By mounting the display 112 and the keyboard 110 on the head 100, this feature facilitates keyboard entry and data reading at the site of the symbol to be read, rather than at a more remote location away from the head.

Inasmuch as the laser diode 102 does not require a voltage step-up component 40, but can be energized directly from a low voltage battery, a battery 114 is mounted within the handle 12 to energize the diode. In order to even further facilitate the movement of the head 100 relative to the remainder of the system, the aforementioned cable 66 is totally eliminated. In its place, a transmitting antenna 116 may be mounted at the rear of the handle, and is operative to electromagnetically transmit the processed information to the remainder of the system. In addition to circuit board 59, another circuit board 118 is provided within the barrel to accommodate the additional electronic circuitry for the keyboard and the display.

Still another circuit board 120 is mounted within the barrel to accommodate a radio transmitter 124 and a frequency shift key modulator 125. The modulator 125 will place one or another tone (frequency) on the radio wave generated by the transmitter 124 and telemetered over the antenna 116. In one embodiment of the invention, the telemetered signal corresponds to the digitized signal generated in the head, and the telemetered signal is received by a receiver and a demodulator, which are incorporated in the decode module 68. In this case, the decode module 68 must also have a return transmitter and a modulator for electromagnetically telemetering the decoded information back to the head 100, where the decoded information is then received and demodulated by a return receiver 126 and a demodulator 127, which are also mounted on circuit board 120. The decoded information can be displayed on display 112.

In another embodiment of the invention, the entire decode module 68 may be reduced by large scale integration to one or two integrated circuit chips, e.g. chips 128, 129, which are mounted on yet another printed circuit board 122 provided in the barrel. In this case, the digitized signal generated by sub-circuit 55 is decoded by chips 128, 129 right in the head 100, rather than at some location remote from the head. Hence, the telemetered signal corresponds to the decoded signal generated in the head, and the telemetered signal is transmitted not to a remote decode module, but directly to the host computer 70, which must now include a receiver and a demodulator for the decoded signal. Of course, the host computer must also include a return transmitter and a modulator for electromagnetically telemetering the desired data back to the head 100, where the data is then received and demodulated by the return receiver 126 and the demodulator 127. The data can be displayed on display 112.

The laser scanning head 100 shown in FIGS. 8 and 9 constitutes a complete and independent data processing workstation in the sense that it is fully portable; it is battery-powered; it decodes the symbol in the head; and it is not mechanically connected to any remote system component. The head 100 is readily adaptable to interact with any host computer.

As noted previously, the host computer or terminal 70 act as a data base, and may be incorporated in a built-in large computer installation; or can be made smaller and constitute a light-weight, hand-held, discrete unit; or, as shown in FIGS. 8 and 9, said database an integrated circuit storage chip 129' and be mounted within the head 100 on board 122 to form a complete data collection terminal which facilitates real-time and subsequent data processing at the site of the symbol to be read. As described above, the interconnection between the module 68 and computer 70 can be hand-wired, or by means of telemetry, or by plug-in connection, or by electrical circuit connection in the head.

For example, the trigger switches 76, 76' respectively shown in FIGS. 1 and 8 are both operative to depress the spring 78; however, switch 76 is provided with a safety overload feature. A groove 75 is formed at the rear of the trigger 76 and forms a user-engaging trigger portion 77 and a switch-actuating trigger portion 79. A guide finger 71 on the trigger extends into a guide aperture formed in a front abutment portion 73 on the handle 12. In use, a user depresses the user-engaging portion 77, and causes the switch-actuating portion 79 to pivot and depress the spring 78. However, in the event that the user depresses the user-engaging portion 77 too forcefully, i.e. beyond a predetermined safety load limit, the user-engaging portion 77 will slightly bend or flex relative to the switch-actuating portion 79 due to the slight structural weakness caused by the presence of the groove 75. This feature safeguards the spring 78 and the circuit board on which the spring 78 is mounted, and protects the spring 78 and its circuit board from being damaged due to an excessive load on the trigger switch. The predetermined safety load limit for the trigger is determined beforehand, and the user-engaging portion 77 only flexes if this limit is exceeded. As a further safety feature, the user-engaging portion 77 is permitted to flex only until the latter abuts against the front abutment portion 73 which effectively prevents any further rearward movement of the trigger.

Another useful construction relates to increasing the depth of field, i.e. the working distance, of the laser scanning head. It will be recalled that a bar code symbol can be read at either side of the reference plane, and the range in which the symbol is read is defined as the depth of field. For convenience, a symbol that is located between the reference plane and the head is defined as a "close-in" symbol, whereas a symbol that is located on the other side of the reference plane away from the head is defined as a "far-out" symbol.

As noted above, the sensor means detects the light intensity of the reflected light beam, and generates an electrical signal indicative of the detected light intensity. This electrical signal is then processed by the signal processing means. Inasmuch as the amplitude of the reflected light, and hence the amplitude of the generated electrical signal, is a function of the distance at which the symbol is located relative to the sensor means in the head, laser scanning system designs should take into account the variation in amplitude which occurs for close-in and far-out symbols. For example, in a case where the depth of field ranges from about ½" to about 6", and where the reference plane is on the order of 4" from the sensor means, then the amplitude variation at the opposite ends of the range can be on the order of 100:1. This amplitude variation is undesirably high, but could be electrically compensated for in the electronic signal processing circuitry. However, the required electronic circuitry is highly complex and expensive, thereby relegating the laser scanning system designer to be satisfied with a much smaller depth of field, rather than include the complex electronic circuitry.

In accordance with the invention, passive optical means are provided for decreasing the aforementioned amplitude variation, particularly by reducing the amplitude associated with a close-in symbol without the addition of the complex electronics. In a preferred embodiment, the aforementioned window associated with the sensor means, i.e. non-scan window 52 or scan windows 150, 176, rather than constituting a mere window with no light-modifying properties, may be replaced by a positive lens such as a fresnel lens. The fresnel lens window has a height larger than that of the sensor means, i.e. the photo-detectors. For far-out symbols, the fresnel lens window directs virtually all the returning rays of the reflected light beam to the photo-detectors. This boosts the signal strength associated with the far-out symbol. For close-in symbols, only a portion of the returning rays of the reflected light beam is focused by the fresnel lens window on the photo-detectors, thereby decreasing the signal strength associated with the close-in symbol.

Hence, the fresnel lens window is optically operative not only to reduce the amplitude associated with a close-in symbol, but also to increase the amplitude associated with a far-out symbol. In the aforementioned case where the depth of field ranges from about ½" to about 6" from the sensor means the fresnel lens window changes the amplitude variation from about 100:1 to about 5:1. This reduced dynamic range is well within the capabilities of the electronics of the signal processing means, which now need not be designed with complex electronic signal processing circuitry to account for high amplitude variation. The depth of field has been increased without the need for such additional complex electronic circuitry.

Rather than a fresnel lens window, another passive optical light-modifier means such as a stationary louver configured like a venetian blind with mutually parallel permanently-open slats could be mounted at the front region of the housing, either forwardly or rearwardly of the window associated with the sensor means. The closer the symbol is to the sensor means, the more light is blocked by the louver. When the symbol is distant, more light will pass through the louver to the sensor means. Alternatively, an overhead visor or shade could be mounted forwardly of the sensor means. As the symbol comes closer to the sensor means, the visor blocks more and more light from the sensor means. In both cases, the reflected light beam is optically modified and the amplitude associated with close-in symbols will be reduced, thereby flattening the amplitude variation and increasing the depth of field.

Still another way of optically increasing the depth of field by decreasing the amplitude variation is to constitute the window associated with the sensor means as a narrow spectral band interference filter (6328 Angstrom), or to mount a discrete interference filter at either side of the window. The filter is operative to suppress ambient light and to attenuate the amplitude associated with close-in symbols, thereby enhancing the dynamic range.

While the invention has been illustrated and described as embodied in a narrow-bodied, single-and twin-windowed, portable laser scanning head for reading bar code symbols, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for reading bar code symbols or the like and processing data associated therewith employing a portable unit supported by the user comprising:

(a) a light beam generator in said unit including a laser producing a light beam directed onto a symbol being read;

(b) a light detector in said unit receiving reflected light from said symbol being read and producing electrical signals related thereto and a scanner in said unit for automatically scanning at least one of said light beams and a field of view across said symbol being read while said symbol is spaced from said unit and visible to a user supporting said unit, the automatic scanning operation of the scanner being initiated by said user;

(c) processor circuitry including decoder circuitry in said unit for receiving said electrical signals and generating a digitized signal to generate therefrom data descriptive of said bar code symbol;

(d) said processor circuitry including at least one integrated circuit in said unit for data processing;

(e) an integrated circuit storage chip in said unit;

(f) a manually activated data input and data display device on said unit; and (g) a portable housing containing said light beam generator, said light detector, said processor circuitry, said integrated circuit storage chip, and said manually activated data input and data display device.

2. The apparatus of claim 1 further comprising a power supply for said light beam generator, said light detector and said processor circuitry, said power supply being contained within said housing.

3. The apparatus of claim 1 wherein said integrated circuit storage chip facilitates real-time and subsequent data processing at the site of said symbol being read.

4. The apparatus of claim 1 wherein said data which is descriptive of said bar code symbol is stored in said integrated circuit storage chip.

5. The apparatus of claim 1 wherein said integrated storage chip is a database.

6. The apparatus of claim 1 wherein said portable housing is a hand-held housing.

7. Apparatus for reading bar code symbols or the like and processing data associated therewith employing a portable unit supported by the user, comprising:

a) a light detector in said unit receiving reflected light from a symbol being read and producing electrical signals related thereto;

b) a scanner in said unit for automatically scanning across said symbol being read, the automatic operation of the scanner being initiated as a result of a manual activity of a user supporting said unit;

c) processor circuitry including decoder circuitry in said unit, said decoder circuitry receiving said electrical signals and generating symbol recognition information;

d) means for terminating said reading of said symbol in response to said recognition information;

e) said processor circuitry including at least one integrated circuit in said unit for data processing;

f) a manually activated data input and a data display device on said unit; and g) a portable housing containing said light detector, said scanner, said processor circuitry, said integrated circuit, and said manually activated data input and data display device.

8. The apparatus according to claim 7 wherein said unit is held by said user in a position spaced from said symbol being read.

9. The apparatus according to claim 7 further comprising a light beam generator including a laser light source.

10. The apparatus according to claim 9 wherein said light beam generator is contained in said portable housing.

11. The apparatus according to claim 10 wherein said scanner includes means for scanning a light beam generated in said unit across said symbol being read.

12. The apparatus of claim 7 wherein said portable housing is a hand-held housing.

13. A method for reading bar code symbols or the like and processing data associated therewith employing a portable unit supported by the user, comprising the steps of:

a) automatically scanning across a symbol being read;

b) detecting in said unit reflected light from said symbol being read and producing electrical signals related thereto;

c) receiving said electrical signals by processor circuitry including decoder circuitry in said unit, processing said electrical signals, and generating symbol recognition information, said processor circuitry including at least one integrated circuit in said unit for data processing;

d) entering and displaying data at said unit by a manually activated data input and a data display device on said unit;

e) said steps of automatically scanning, detecting, receiving, generating, and processing being performed in a portable housing containing said processor circuitry, said integrated circuit, and said manually activated data input and data display device.

14. A method according to claim 13 further comprising the step of positioning said unit so that it is not in physical contact with said symbol being read.

15. A method according to claim 13 further comprising the step of generating a light beam is said unit using a laser light source.

16. A method according to claim 15 wherein said scanning includes scanning a light beam generated in said unit across said symbol being read.

17. The apparatus of claim 13 wherein said portable housing is a hand-held housing.

18. A portable unit supported by the user for reading bar code symbols or the like, comprising:

a) symbol detection means comprising a light source generating a light beam directed from said unit toward a symbol to be read, said symbol being spaced from said unit, said symbol detection means receiving reflected light from a field of view containing said symbol, said symbol being read to produce electrical signals corresponding to said symbol; said symbol detection means further comprising a scanning means to automatically scan at least one of said light beams and said field of view across said symbol to be read while said symbol is visible to a user of the unit;

b) evaluation means responsive to said electrical signals for recognizing the successful reading of a symbol being scanned;

c) read control means actuatable by a user of said symbol detection means to initiate reading of said symbol, said evaluation means and said read control means employing a microprocessor in said unit;

d) means on a surface of said unit for manually entering data and for displaying data;

e) a power supply for said unit; and f) a light weight, portable housing means containing said symbol detection means, evaluation means, read control means, microprocessor, and means for manually entering and displaying data.

19. The unit of claim 18 wherein said means for manually entering data includes a plurality of manually activated keys.

20. The unit of claim 18 wherein said power supply further comprises a battery.

21. The unit of claim 20 wherein said power supply is contained in said portable housing means.

22. The unit of claim 18 wherein said read control means includes a manually actuated trigger.

23. The unit of claim 18 wherein said scanning means comprises a moving mirror driven by an electric motor.

24. The portable unit of claim 18 wherein said portable housing is a hand-held housing.

25. Apparatus for reading bar code symbols or the like and processing data associated therewith employing a portable unit, comprising:

(a) a light beam generator in said unit including a laser producing a light beam directed onto a symbol being read;

(b) a scanner in said unit for automatically scanning at least one of said light beams and a field of view across said symbol being read while said symbol is spaced from the unit and is visible to a user supporting the unit, the automatic scanning operation of said scanner being initiated by said user;

(c) a light detector in said unit receiving reflected light from said symbol being read and producing electrical signals related thereto;

(d) processor circuitry including decoder circuitry for receiving said electrical signals and generating a digital signal to generate therefrom data descriptive of the bar code symbol;

(e) said processor circuitry including at least one integrated circuit in said unit for data processing;

(f) an integrated circuit storage chip in said unit;

(g) a data display device on said unit; and (h) a portable housing containing said light beam generator, light detector, processor circuitry, and integrated circuit storage chip.

26. The apparatus of claim 25 wherein said integrated circuit storage chip facilitates real-time and subsequent data processing at the site of said symbol being read.

27. The apparatus of claim 25 wherein said data which is descriptive of said bar code symbol is stored in said integrated circuit storage chip.

28. The apparatus of claim 25 wherein said portable housing is a hand-held housing.

29. The apparatus of claim 25 wherein said integrated storage chip is a database.

* * * * *

UNITED STATES PATENT AND TRADEMARK OFFICE
CERTIFICATE OF CORRECTION

Patent No.: 5,532,469

Dated: July, 2, 1996

Inventors: Howard M. Shepard, Edward D. Barkan, Jerome Swartz

It is certified that error appears in the above-identified patent and that said Letters Patent is hereby corrected as shown below:

At column 4, line 44, after "sweeping", insert "i.e., scanning"
At column 4, line 48, before "light" insert "variable"
At column 11, lines 32,33, delete "aforementioned co-pending application Ser. No. 125,768
At column 17, line 1, before "an integrated. . .", insert "can constitute"

Signed and Sealed this

Fourth Day of February, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO : 5,532,469
DATED : July 2, 1996
INVENTOR(S) : Howard M. Shepard, Edward D. Barkan, Jerome Swartz It is certified that error appears in the above-identified patent and that said Letters Patent is hereby corrected as shown below:

At Title Page, left column, in [*]Notice, delete "5,758,717" and insert --4,758,717--.

Signed and Sealed this

Twelfth Day of August, 1997

Attest:

BRUCE LEHMAN

*Attesting Officer*        *Commissioner of Patents and Trademarks*